(12) United States Patent
De Bree

(10) Patent No.: US 10,874,043 B2
(45) Date of Patent: Dec. 29, 2020

(54) DISTRIBUTION DEVICE

(71) Applicant: REDEXIM HANDEL-EN EXPLOITATIE MAATSCHAPPIJ B.V., Zeist (NL)

(72) Inventor: Cornelius Hermanus Maria De Bree, Zeist (NL)

(73) Assignee: REDEXIM HANDEL-EN EXPLOITATIE MAATSCHAPPIT B.V., Zeist (NL)

( * ) Notice: Subject to any disclaimer, the term of this patent is extended or adjusted under 35 U.S.C. 154(b) by 312 days.

(21) Appl. No.: 15/780,788

(22) PCT Filed: Dec. 2, 2016

(86) PCT No.: PCT/EP2016/079579
§ 371 (c)(1),
(2) Date: Jun. 1, 2018

(87) PCT Pub. No.: WO2017/093479
PCT Pub. Date: Jun. 8, 2017

(65) Prior Publication Data
US 2020/0245532 A1    Aug. 6, 2020

(30) Foreign Application Priority Data

Dec. 4, 2015   (DE) .................... 20 2015 008 329 U

(51) Int. Cl.
*A01C 7/20*   (2006.01)
*A01C 15/00*  (2006.01)
(Continued)

(52) U.S. Cl.
CPC ............ *A01C 7/208* (2013.01); *A01C 15/006* (2013.01); *A01B 49/06* (2013.01); *A01C 7/06* (2013.01); *A01C 7/081* (2013.01); *A01C 15/04* (2013.01)

(58) Field of Classification Search
CPC .. A01C 7/208; A01C 7/20; A01C 7/00; A01C 15/006; A01C 15/005; A01C 15/00;
(Continued)

(56) References Cited

U.S. PATENT DOCUMENTS 2,851,200 A    9/1958  De Foa

FOREIGN PATENT DOCUMENTS

| DE | 43 35 692 A1   | 4/1995 |
| WO | 2010/064676 A1 | 6/2010 |
| WO | 2014/066643 A2 | 5/2014 |

OTHER PUBLICATIONS

International Search Report and Written Opinion of the International Search Authority dated Mar. 1, 2017 of corresponding International application No. PCT/EP2016/079579; 12 pgs.

*Primary Examiner* — Christopher J. Novosad
(74) *Attorney, Agent, or Firm* — Maier & Maier, PLLC

(57) ABSTRACT

A distribution device, in particular a sowing machine, for distributing a good, with at least one storage container and at least one discharge apparatus. The storage container is connected to the discharge apparatus by at least one outlet channel such that the good arranged in the storage container can be transferred to the discharge apparatus such that the good can be distributed by the discharge apparatus. The distribution device has a first and a second part. The first and the second parts can be moved in relation to each other such that the outlet channel can be at least partially exposed.

15 Claims, 4 Drawing Sheets

(51) Int. Cl.
*A01B 49/06* (2006.01)
*A01C 7/06* (2006.01)
*A01C 7/08* (2006.01)
*A01C 15/04* (2006.01)

(58) Field of Classification Search
CPC .. A01C 7/06; A01C 7/081; A01C 7/08; A01C 15/04
See application file for complete search history.

DISTRIBUTION DEVICE

FIELD

The invention relates to a distribution device, in particular a sowing machine, as well as to a method for the distribution of a good on or in a soil.

BACKGROUND

Distribution devices, in particular sowing machines, are known that comprise at least one storage container and at least one discharge apparatus. The storage container is preferably connected to the discharge apparatus via at least one outlet channel such that the good arranged in the storage container can be transferred to the discharge apparatus for the distribution of the good by means of the discharge apparatus.

However, with these known distribution devices, there is an increasing need for a facilitation of the maintenance.

SUMMARY

Thus, it is an object of the present invention to provide a distribution device, as well as a method for distributing a good on or in a soil, in which the maintenance of the distribution device is facilitated.

The invention advantageously provides that the distribution device has a first and a second part, wherein the first and the second part can be moved in relation to each other such that the good arranged in the storage container can be transferred to the discharge apparatus.

The distribution device may be moved from a working position to a maintenance position by moving the first and the second part in relation to each other.

This has the advantage that the outlet channel is relatively easy to access during maintenance so that obstructions can be removed easily. Such obstructions occur in particular when the distribution device is no used for a longer period, especially in wet weather. The good still present in the outlet channel can easily clump together and cause obstructions of the outlet channel.

The at least one storage container may be arranged in the first part and the at least one discharge apparatus may be arranged in the second part.

A separating plane may extend between the first and the second part, the plane preferably extending in the horizontal direction.

The first and the second part may preferable be movable in relation to the separating plane.

A plurality of outlet channels may be arranged one beside the other in a row, all outlet channels of the row being exposable by movement of the first and the second part in relation to each other.

In this manner, even when a plurality of outlet channels is provided, all channels can be cleaned at the same time in a relatively simple manner. By moving the first and the second part in relation to each other, not only the outlet channels are particularly easily accessible, but also other parts of the machine, such as e.g. the discharge apparatus, may be easily accessible so that maintenance is facilitated.

At least one first and at least one second storage container may be provided, a respective storage container having at least one outlet channel and at least one discharge apparatus associated thereto, respectively.

By moving the first and the second part in relation to each other both the at least one outlet channel associated to the first storage container and the outlet channel associated to the second storage container may be exposed.

Both the first and the second storage container may each have a series of outlet channels associated thereto, which may each be exposed by moving the first and the second parts in relation to each other.

The first and the second part may be slidable in relation to each other.

This has the advantage that the first and the second part can be moved in relation to each other with relatively little effort.

The first and the second part may be slidable in relation to each other in a direction that is substantially parallel to the ground.

The direction that is substantially parallel to the ground is a horizontal direction.

The first and the second part may be pivotable in relation to each other.

The first and the second part may be pivotable about a substantially horizontal axis, the horizontal axis extending substantially parallel to the ground.

According to the present invention, a method for distributing a good on or in the ground may further be provided, the method comprising the following steps:
  arranging the good in at least one storage container of a distribution device,
  guiding the good into at least one discharge apparatus via at least one outlet channel of the distribution device, the good being distributed on or in the ground by means of the discharge apparatus.

It is advantageously provided that a first part and a second part of the distribution device are movable in relation to each other so that the at least one outlet channel can be exposed.

The at least one exposed channel may be cleaned.

The first and the second part may be displaced in relation to each other.

The first and the second part may be displaced substantially in the horizontal direction.

The first and the second part may be pivoted in relation to each other.

The first and the second part may preferably be pivoted in relation to each other about a substantially horizontal axis.

BRIEF DESCRIPTION OF THE FIGURES

An embodiment of the invention will be explained hereinafter in detail with reference to the drawings.

The Figures schematically show.

DETAILED DESCRIPTION

Figure 1:
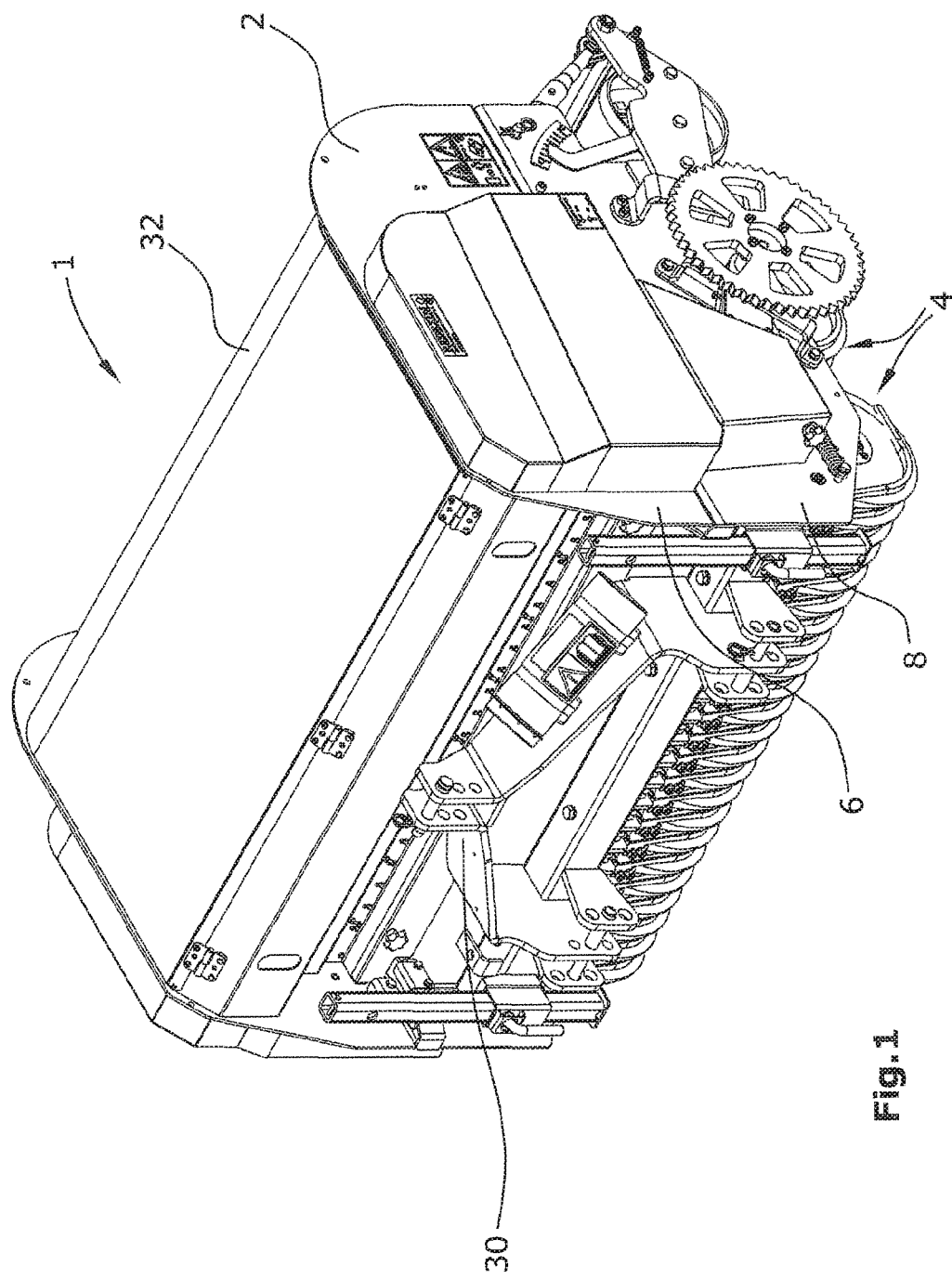
FIG. 1 the distribution device of the present invention,
FIG. 2 the distribution device of FIG. 1 in the maintenance position,
FIG. 3 a detail of FIG. 2,
FIG. 4 a sectional view of the device of FIGS. 1 and 2,
FIG. 5 a detail of FIG. 4.

FIG. 1 illustrates a distribution device 1 for distributing a good on or in a ground 5. The distribution device 1 can comprise a coupling element 30 by which the distribution device can be coupled to a towing vehicle, e.g. a tractor. The distribution device 1 has a first part 6 and a second part 8, wherein the first part 6 and the second part 8 are movable in relation to each other. The distribution device further comprises, preferably in the upper portion, at least one storage container 28 which is covered by a housing 32 in the embodiment illustrated in FIG. 1.

The distribution device 1 further comprises at least one discharge apparatus 4 by which the good may be distributed on or in the ground. The storage container 28 and the discharge apparatus 4 are preferably connected with each other via at least one outlet channel 14, so that the good arranged in the storage container can be transferred to the discharge apparatus 4 for distributing the good by means of the discharge apparatus 4.

The discharge apparatus may be a discharge apparatus typically provided in sowing machines.

Figure 2:
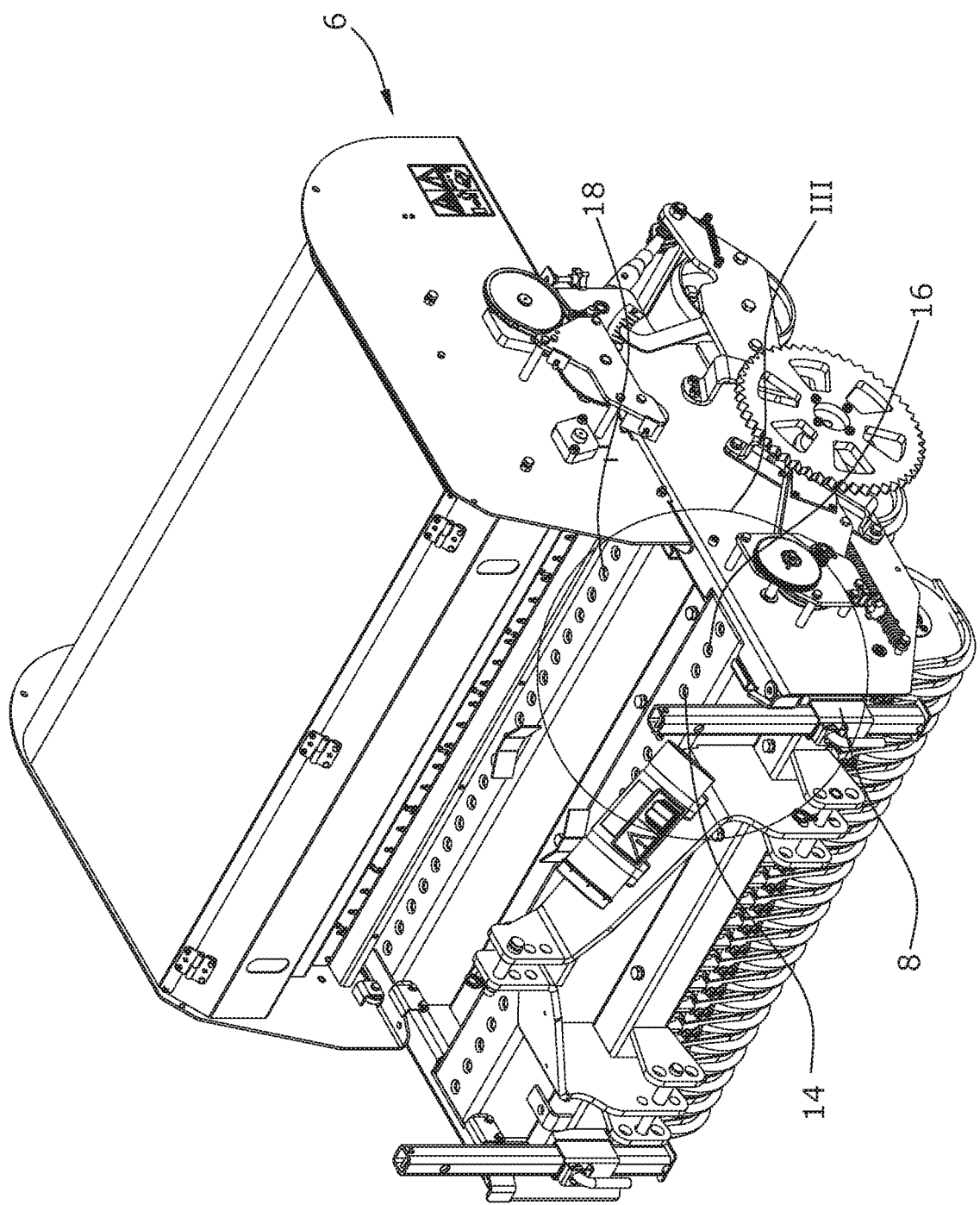

FIG. 2 illustrates the distribution device of FIG. 1, with the first part 6 and the second part 8 having been moved in relation to each other. As can be seen in FIG. 2, the first and the second part 6, 8 may be movable in relation to each other such that the outlet channel 14 can be exposed in part. As can be seen in FIG. 2, a plurality of outlet channels 14 is arranged side by side in a row in the embodiment illustrated. Further, two rows 16, 18 of outlet channels 14 are provided arranged side by side. Due to the fact that the first part 6 and the second part 8 have been moved in relation to each other, both rows of outlet channels 16, 18 are exposed.

The maintenance of the distribution device 1 can now be performed in a very simple manner. Specifically, obstructions in the outlet channels 14 can be removed easily. Such obstructions often occur in humid conditions, when the good to be passed through the outlet channel sticks together. The good may be a pourable good. It may be seed grains or similar. As can be seen in FIG. 2, the discharge apparatus 4 can relatively easily be accessed also in the maintenance position and can also be maintained relatively easily.

Figure 3:
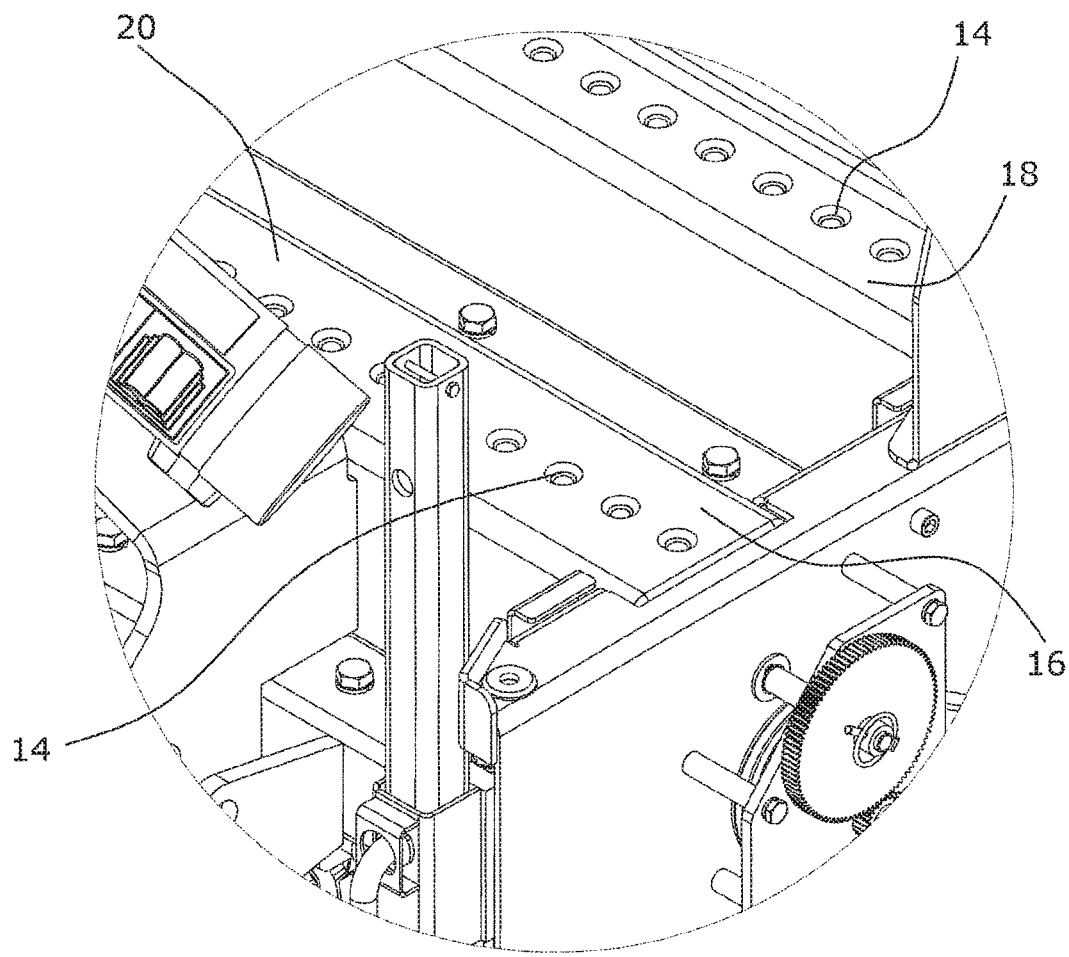

FIG. 3 illustrates a detail of FIG. 2. Here, the outlet channels 14 arranged in a first and a second row 16, 18 are clearly visible. Further, an additional weight 20 may be provided which may be arranged laterally of the first row 16 of the outlet channels 14 arranged side by side.

Figure 4:
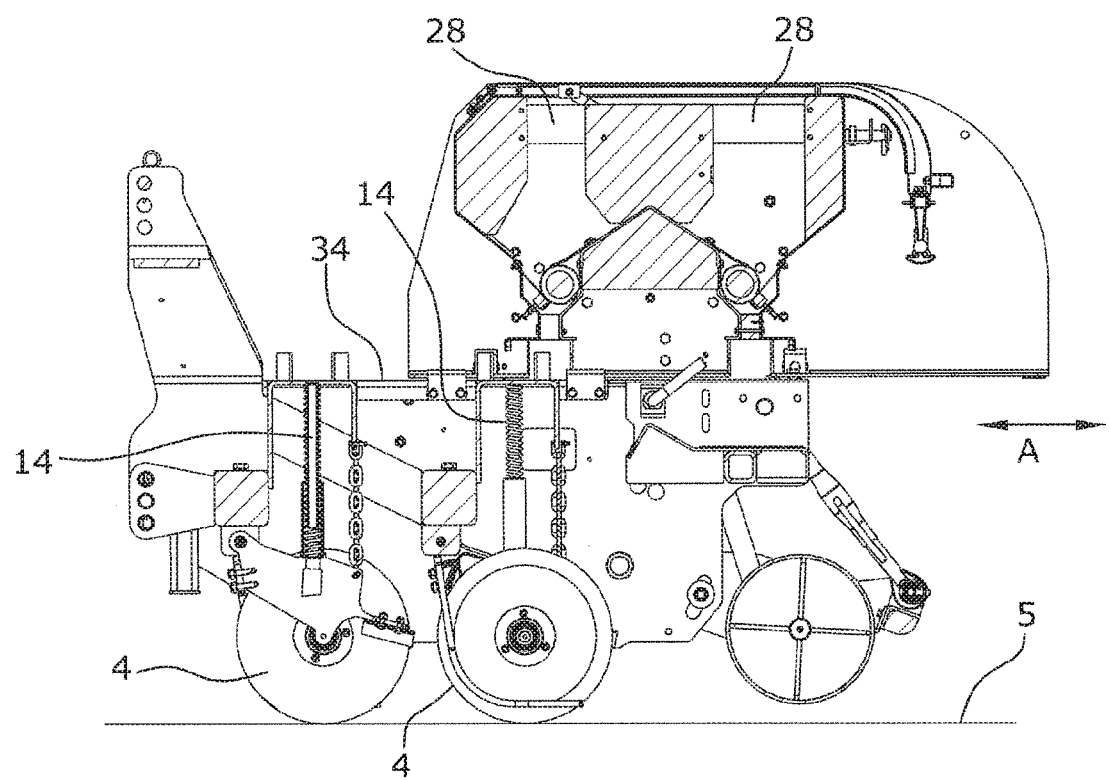

FIG. 4 is a sectional view of the distribution device 1. The first part 6 has been moved in relation to the second part 8 in a preferably horizontal direction A. The horizontal direction A preferably extends parallel to the ground 5. As can be seen in FIG. 4, a first and a second storage container 28 are provided in the embodiment illustrated. Metering means 24 are arranged in the lower portion of the storage containers 28, by means of which the good provided in the storage containers 28 can be metered out.

Further, FIG. 4 illustrates the outlet channels 14 by means of which the good can be transferred to the discharge apparatus 4. A separating plane 34 extends between the first and the second part 6, 8. The separating plane 34 preferably extends substantially horizontally and thus substantially parallel to the ground 5.

As an alternative, the first part 6 may also be pivoted in relation to the second part 8. Preferably, pivoting is effected around a substantially horizontal axis. This alternative embodiment is not illustrated in the Figures.

Figure 5:
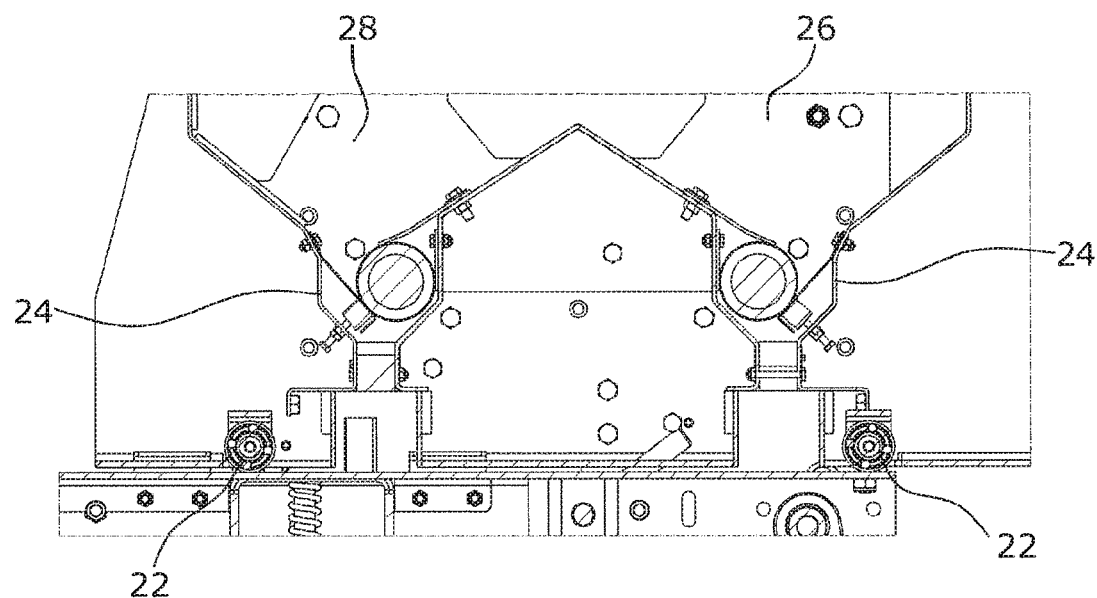

FIG. 5 is a detail of FIG. 4. The metering means 24 are illustrated in more detail therein. Further, the bearings 22 are visible, which support the first part 6 in relation to the second part 8 and allow an easy displacement of the first part 6 in relation to the second part 8.

In a method for distributing a good on or in the ground, in particular one good is arranged in the at least one storage container 28. The good is then preferably metered by the metering means 24 and transferred into the at least one outlet channel 14. The good is guided to the discharge apparatus 4 through the outlet channel 14, the good being distributed on or in the ground 5 by means of the discharge apparatus 4. The first and the second part 6, 8 of the distribution device 1 can be moved in relation to each other so that the distribution device is transferred into the maintenance position, wherein the at least one outlet channel is at least partly exposed in the maintenance position.

In the maintenance position illustrated in FIG. 4, it is possible to clean the at least one outlet channel 14. Other maintenance work, such as e.g. maintenance work on the discharge apparatus 4, may also be performed easily.

Further, a locking mechanism 40 may be provided by means of which the first part 6 and the second part 8 can be locked so that the first and the second part 6, 8 can no longer be moved in relation to each other. This is true in particular in the working position illustrated in FIG. 1. The locking mechanism 40 can be released. In the released position, the distribution device is in a maintenance position, the first and the second part 6, 8 being movable in relation to each other in the maintenance position, so that the outlet channel 14 can be exposed in part.

In the maintenance position means that in this state, the machine can be maintained and refurbished and, in specific cases, also be repaired.

The invention claimed is:

1. A sowing machine for distributing a good, comprising:
   at least one storage container and
   at least one discharge apparatus, wherein the at least one storage container is connected to the at least one discharge apparatus by at least one outlet channel such that the good arranged in the at least one storage container can be transferred to the at least one discharge apparatus such that the good can be distributed by the at least one discharge apparatus, wherein the sowing machine has a first and a second part, wherein the first and the second part can be moved in relation to each other such that the at least one outlet channel can be at least partially exposed,
   wherein the at least one storage container is disposed in the first part and the at least one discharge apparatus is disposed in the second part,
   wherein the first part is disposed on top of the second part, and
   wherein the first part is configured to move in a direction substantially parallel to a ground along a top surface of the second part.

2. The sowing machine of claim 1, wherein the at least one storage container is arranged in the first part and the at least one discharge apparatus is arranged in the second part.

3. The sowing machine of claim 1, wherein a separating plane extends between the first and the second part, the separating plane extending in a horizontal direction.

4. The sowing machine of claim 1, wherein a plurality of outlet channels is arranged one beside the other in a row, all outlet channels of the row being exposable by movement of the first and the second part in relation to each other.

5. The sowing machine of claim 1, wherein at least one first and at least one second storage container are provided, a respective storage container having at least one outlet channel and at least one discharge apparatus associated thereto, respectively.

6. The sowing machine of claim 5, wherein by moving the first and the second part in relation to each other, both the at least one outlet channel associated to the at least one first storage container and the at least one outlet channel associated to the at least one second storage container can be exposed.

7. The sowing machine of claim 1, wherein the first and the second part are slidable in relation to each other.

8. The sowing machine of claim 7, wherein the first and the second part are slidable in relation to each other in a direction that is substantially parallel to a ground.

9. The sowing machine of claim 1, wherein the first and the second part are pivotable in relation to each other.

10. The sowing machine of claim 1, wherein the first and the second part are pivotable about a substantially horizontal axis, the substantially horizontal axis ex-tending substantially parallel to a ground.

11. A method for distributing a good on or in a ground, the method comprising:
    arranging the good in at least one storage container of a distribution device,
    guiding the good into at least one discharge apparatus via at least one outlet channel of the distribution device, the good being distributed on or in the ground by the at least one discharge apparatus, wherein a first part and a second part of the distribution device are movable in relation to each other so that the at least one outlet channel is exposed,
    wherein the at least one storage container is disposed in the first part and the at least one discharge apparatus is disposed in the second part,
    wherein the first part is disposed on top of the second part, and
    wherein the first part is configured to move in a direction substantially parallel to a ground along a top surface of the second part.

12. The method of claim 11, wherein when the first part and the second part are moved, the at least one exposed outlet channel is cleaned.

13. The method of claim 11, wherein the first and the second part are displaced in relation to each other.

14. The method of claim 11, wherein the first and the second part are displaced substantially in a horizontal direction.

15. The method of claim 11, wherein the first and the second part are pivoted in relation to each other.

* * * * *